R. McCULLY.
Railroad Conductor's Alarm and Fare-Registering Punch.
No. 200,077.   Patented Feb. 5, 1878.
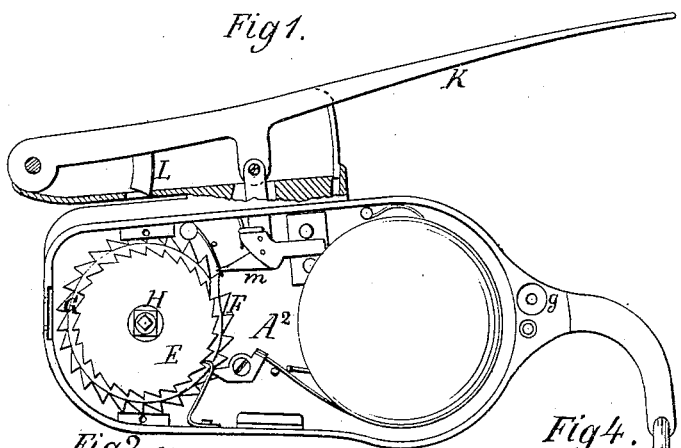
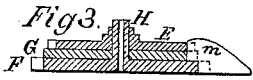
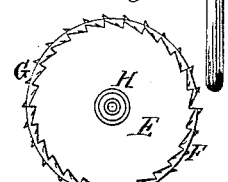
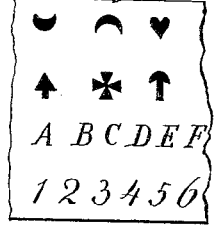
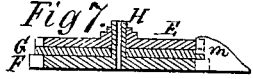
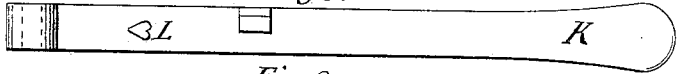
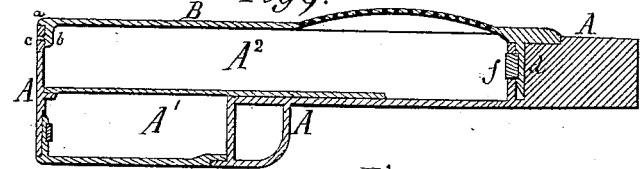
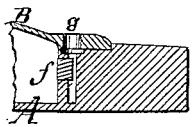
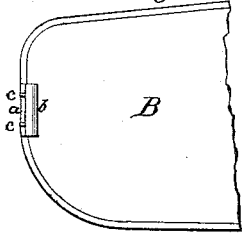
Witnesses:
James Martin Jr.
J. P. Theodore Lang.
Inventor.
Robert McCully,
by
Mason, Fenwick & Lawrence
Attys.

UNITED STATES PATENT OFFICE.

ROBERT McCULLY, OF PHILADELPHIA, PENNSYLVANIA.

IMPROVEMENT IN RAILROAD-CONDUCTORS' ALARM AND FARE-REGISTERING PUNCHES.

Specification forming part of Letters Patent No. 200,077, dated February 5, 1878; application filed May 25, 1876.

*To all whom it may concern:*

Be it known that I, ROBERT MCCULLY, of Philadelphia, in the county of Philadelphia and State of Pennsylvania, have invented certain new and useful Improvements in Railroad-Conductors' Alarm and Fare-Registering Machines; and I do hereby declare that the following is a full, clear, and exact description of the same, reference being had to the accompanying drawings, forming part of this specification, in which—

Figure 1 is a side elevation and partial section of the machine, the cap-plate of the bell and registering mechanism and the dial-plate and pointer being removed. Fig. 2 is an edge view of the registering-ratchets and notched plate between them. Fig. 3 is a section of the parts shown in Fig. 2, with the pawl fitting in a tooth of each of the ratchets and in a notch of the intermediate plate. Fig. 3½ is a modification. Fig. 4 is a face view of the registering-wheels and intermediate notched plate, detached from the machine and slightly modified in construction. Fig. 5 is an edge view of the same with the pawl slightly modified, bearing against a tooth of each ratchet, and fitting in the notched plate. Fig. 6 is an edge view of the registering-wheels and intermediate plate slightly modified in construction. Fig. 7 is a section of the same with the pawl slightly modified, bearing against a tooth of each ratchet, and passed through a portion of the rim of the intermediate plate. Fig. 8 is an inverted view of the hand-lever and shearing-punch. Fig. 9 is a horizontal section of the case of the machine with its cap-plates secured in position. Fig. 10 is a horizontal section of a portion of the case, showing the seal-cavity at the key-hole of the case. Fig. 11 is an inside view of a portion of the cap-plate of the register-chamber. Fig. 12 is a portion of a chart of characters employed by me in connection with bell-punches.

The nature of my invention consists in a register for railroad-conductors' alarm and registering-machines, provided with ratchet-wheels separated by a plate notched at one place on its rim, either entirely or partly across, the base of the notch thus formed being on a plane with the base of the teeth of the multiplying-ratchet, so as to permit the pawl to fall to the base of the teeth of the said ratchet every time the unit-ratchet makes a complete revolution. By this part of my invention is avoided the necessity of having the pawl fall so near to the center of the smallest ratchet-wheel, and thereby decrease the leverage for moving it when the largest ratchet has made a complete revolution. The spring for working the pawl can also be made lighter, and the spring-pawl is held up out of binding contact with the teeth of the largest ratchet by the cylindric surface of the rotating plate until it is nearly time for a new tooth to be taken by the pawl, and thus the machine can be operated with greater ease and with less wear.

My invention consists, second, in the cap of that part of the case which contains the alarm and register, made with a lip, a flange, and horizontal pins or dowels on its forward end, and with a shoulder and a catch-pin on its rear end, in combination with a case constructed to receive the dowels horizontally in a longitudinal direction and the catch horizontally in a transverse direction, whereby the cap is fitted and confined securely in place by a spring taking into the catch, and the use of a hinge is dispensed with.

To enable others skilled in the art to understand my invention, I will proceed to describe it.

In the accompanying drawings, A represents the case, constructed with a chamber, $A^1$, for the reception of pieces punched from the ticket, coupon, or strip of paper, and with a chamber, $A^2$, for containing the alarm-bell, its mechanism, and the register. The cap B of this case is perforated opposite the bell or made solid, and is formed with a lip, $a$, flange $b$, and dowels $c\ c$ at its front end. The dowels $c\ c$ enter horizontal holes formed in the front end of the case, and the flange seats itself squarely in a notch or shoulder formed in the case on the inside, and the lip bears against the side edge of the front portion of the case, as shown. The rear end of the cap is provided with the usual spring catch-pin $d$, which passes into a hole of the case and engages with the locking-spring $f$. A little on one side of this catch-pin the key-hole for unlocking the cap is formed, and around this key-hole a cavity, $g$, for receiving the seal of the railroad company is formed, as shown. The dowels $c\ c$ enter the holes in the front of the case, and thus prevent the cap getting loose, or being opened at the end which is usually hinged, so long as the catch-pin is locked; but when the catch-pin is unlocked the cap can readily be removed from the case. The cap of the chamber $A^1$ is fastened and locked in the same manner as shown in my former patents, and need not be described here.

The registering-ratchets E F are of unequal or equal diameters, and have teeth of the same or different depths. Between a pair of such ratchets a plate, G, of a diameter a little greater than or equal to the multiplying-ratchet E, is placed, and these parts E F G are arranged within the case upon an arbor, H, in the usual manner.

In the periphery of the separating-plate G is cut a notch equal in length to the thickness of the plate, or only half equal to the same, as shown in the drawings, and in this notch the pawl $m$ enters when the unit-ratchet wheel has made a complete revolution, and it is necessary that the multiplying-ratchet move the distance of one tooth.

In some cases the pawl will have a straight working end, as in Fig. 5, or it may have a stepped end, as in Fig. 3, or a forked end, as in Fig. 7, these forms being given according to the mode of notching the separating-plate G; but in all of these forms the pawl will ride upon the circular ridge formed by the plate G, and be held free from the teeth of the unit-ratchet until it (the said pawl) has almost completed its return-stroke for taking hold of another tooth. It also will be kept out of contact with the multiplying-ratchet until the unit-ratchet completes each of its full revolutions, and then will fall into position for moving the multiplying-ratchet.

The hand-lever K of the machine is connected with the registering and alarm mechanism, as shown, or in any other proper manner, and on its under side is placed and rigidly fastened a punch, L, of the form of a heart, or the letter A, or the number 1, or any other symbolical character, such as shown in Fig. 12. This punch works through a die of corresponding form set in the top of the case over the chamber $A^1$, as shown.

Any character found on charts used by conductors, or any letter of the alphabet, or any number, may be adopted, either singularly or in combination, for the form of the punches, those shown being given as an illustration of the principle.

Having described my invention, what I claim, and desire to secure by Letters Patent, is—

1. The combination of the intermediate notched plate with the registering-wheels and the reciprocating pawl, so arranged that the pawl rides upon the rim of the notched plate, and is held in relief from the teeth of the ratchets in its back strokes until each of its back movements is nearly completed, and from contact with the teeth of the multiplying-ratchet until the unit-ratchet has made a complete revolution, substantially as described.

2. The cap of the register and alarm-chamber of the machine, fastened in position by means of the dowels, catching-pin, and a spring, substantially as described.

ROBERT McCULLY.

Witnesses:
JAMES MARTIN, Jr.,
C. H. MOULTON.